United States Patent [19]

Jackson

[11] 4,151,096
[45] Apr. 24, 1979

[54] CLAY-FREE WELLBORE FLUID

[75] Inventor: Jack M. Jackson, Houston, Tex.

[73] Assignee: Brinadd Company, Houston, Tex.

[21] Appl. No.: 861,861

[22] Filed: Dec. 19, 1977

Related U.S. Application Data

[63] Continuation-in-part of Ser. No. 828,347, Aug. 29, 1977, abandoned, which is a continuation of Ser. No. 558,815, Mar. 17, 1975, abandoned.

[51] Int. Cl.$^2$ .................................................. C09K 7/02
[52] U.S. Cl. ........................... 252/8.5 A; 252/8.5 C; 252/8.5 P; 252/8.55 R
[58] Field of Search ............ 252/8.5 A, 8.5 C, 8.55 R, 252/8.5 P

[56] References Cited

U.S. PATENT DOCUMENTS

| | | | |
|---|---|---|---|
| 2,854,407 | 9/1958 | Mallory | 252/8.5 |
| 2,856,356 | 10/1958 | Weiss et al. | 252/8.5 |
| 2,908,597 | 10/1959 | Owen | 252/8.5 X |
| 3,146,200 | 8/1964 | Goldstein et al. | 252/8.5 |
| 3,220,947 | 11/1965 | Sawyer | 252/8.5 |
| 3,319,715 | 5/1967 | Parks | 252/8.55 X |
| 3,878,110 | 4/1975 | Miller et al. | 252/8.5 |

FOREIGN PATENT DOCUMENTS 771110 3/1957 United Kingdom.

OTHER PUBLICATIONS

Rogers, Composition and Properties of Oil Well Drilling Fluids, Third Edition, Pub. 1963, pp. 417 and 418.

*Primary Examiner*—Herbert B. Guynn
*Attorney, Agent, or Firm*—Kenneth H. Johnson

[57] ABSTRACT

A clay-free, i.e., non-argillaceous wellbore fluid, having unstructured viscosity is obtained by combining water with an additive composition comprising guar gum and at least 10 weight percent of magnesia or magnesium hydroxide based on the weight of guar gum.

6 Claims, No Drawings

CLAY-FREE WELLBORE FLUID

This application is a continuation-in-part of Ser. No. 828,347 filed Aug. 29, 1977 which was a continuation of Ser. No. 558,815 filed Mar. 17, 1975 both now abandoned.

BACKGROUND OF THE INVENTION

The present invention lies in the field of additives to wellbore fluids used while drilling wells in earth formations, completion operations after the drilling has been completed, workover, fracturing, and various other operations in a wellbore, that is, all of those fluids which are employed over the course of the life of a well.

Particularly, the invention is concerned with stablized additives to non-clay wellbore fluids such as pure water, various brines and emulsions of water and oil, more particularly the invention relates to additive compositions for use in wellbore fluids and to wellbore fluid containing these additive compositions.

Generally wellbore fluids will be either clay-based or brines which are clay-free. Fresh water system are sometimes used, but the brines have certain advantages which are discussed below. These two classes are exclusive, that is, clay-based drilling fluids are not brines. A wellbore fluid can perform any one or more of a number of functions. For example, the drilling fluid will generally provide a cooling medium for the rotary bit and a means to carry off the drilled particles. Since great volumes of drilling fluid are required for these two purposes, the fluids have been based on water. Water alone, however, does not have the capacity to carry the drilled particles from the borehole to the surface.

In the drilling fluid class, clay-based fluids have for years preempted the field, because of the traditional and widely held theory in the field that the viscosity suitable for creating a particle carrying capacity in the drilling fluid could be achieved only with a drilling fluid having thixotropic properties, that is, the viscosity must be supplied by a material that will have sufficient gel strength to prevent the drilled particles from separating from the drilling fluid when agitation of the drilling fluid has ceased, for example, in a holding tank at the surface.

In order to obtain the requisite thixotropy or gel strength, hydratable clay or colloidal clay bodies such as bentonite or fuller's earth have been employed. As a result the drilling fluids are usually referred to as "muds". In other areas where particle carrying capacity may not be as critical, such as completion or workover, brine wellbore fluids are extensively employed. The use of clay-based drilling muds has provided the means of meeting the two basic requirements of drilling fluids, i.e., cooling and particle removal. However, the clay-based drilling muds have created problems for which solutions are needed. For example, since the clays must be hydrated in order to function, it is not possible to employ hydration inhibitors, such as calcium chloride, or if employed, their presence must be at a level which will not interfere with the clay hydration. In certain types of shales generally found in the Gulf Coast area of Texas and Louisiana, there is a tendency for the shale to disintegrate by swelling or cracking upon contact with the water, if hydration is not limited. Thus the uninhibited clay-based or fresh water drilling fluids may be prone to shale disintegration.

The drilled particles and any heaving shale material will be hydrated and taken up by the conventional clay-based drilling fluids. The continued addition of extraneous hydrated solid particles to the drilling fluid will increase the viscosity and necessitated costly and constant thinning and reformulation of the drilling mud to maintain its original properties.

Another serious disadvantage of the clay-based fluids is their susceptibility to the detrimental effect of brines which are often found in drilled formations, particularly Gulf Coast formations. Such brines can have a hydration inhibiting effect, detrimental to the hydration requirement for the clays.

A third serious disadvantage of clay-based drilling fluids arises out of the thixotropic nature of the fluid. The separation of drilled particles is inhibited by the gel strength of the drilling mud. Settling of the drilled particles can require rather long periods of time and require settling ponds of large size.

Other disadvantages of clay-based drilling fluids are their (1) tendency to prevent the escape of gas bubbles, when the viscosity of the mud raises too high by the incidental addition of hydratable material, which can result in blowouts; (2) the need for constant human control and supervision of the clay-based fluids because of the expectable, yet unpredictable, variations in properties; and (3) the formation of a thick cake on the internal surfaces of the wellbore.

Fresh water wellbore fluids avoid many of the clay-based fluid problems, but may cause hydration of the formation. The brines have the advantage of containing hydration inhibiting materials such as potassium chloride, calcium chloride or the like. Quite apparently any solid particulate material would be easily separated from the brine solution since it is not hydrated. Thus, the properties of the brine are not changed by solid particulate matter from the wellbore. Similarly, since there is no opportunity for gas bubbles to become entrapped, blowouts are less likely in a clay-free brine-type wellbore fluid.

Thus, the wellbore art now has two competing and incompatible water based systems which can be used in a full range of wellbore operations, i.e., the problem plagued clay-based wellbore fluids or the improved clay-free wellbore fluids, principally brines. In many areas of application, as noted above, clay-free brines are already the usual selection.

Quite frequently guar gum has been used as a water loss control agent in wellbore fluids, in the same manner as starch, other natural gums, such as karaya, psyllium, tragacanth, talha, locust bean, ghatti and the like, cellulosic derivatives, such as carboxymethyl cellulose, carboxymethyl hydroxyethyl cellulose, synthetic polymers such as polyacrylic acid, polyethylene glycol etc. However, the stability of these materials has been a continuing problem, which usually means early and frequent make up of the water loss control material in wellbore operations.

When a non-clay wellbore fluid is used for a purpose requiring relatively high viscosity, for example drilling, it is generally necessary to employ an additive to thicken the fluid to the point where it will have the necessary carrying capacity. Several additives to increase viscosity are commercially available, but most if not all of these have one or more limitations. The viscosifier may be slow to yield, i.e., it may take 15 minutes or more from the time of addition to the time when the fluid becomes thick enough to carry the cuttings. The additives may be effective over only a narrow low temperature range, permitting the fluid to thin out again when a higher temperature is reached. In addition, most of the viscosifiers have a limited service life, again thinning out after a period of use.

Many of the water loss additives has been found to be suited for providing non-structured viscosity to non-clay wellbore fluids. Guar gum can provide non-structured, i.e., non-thixotropic viscosity to wellbore fluids. These materials are water soluble and non-ionic, thus they are not susceptible to being expelled from a brine solution, for example as are the soluble salts of carboxymethyl cellulose. The term "non-structured viscosity" as used here means one wherein viscosity is obtained by physio-chemical rather than by physical means. Asbestos and attapulgite are examples of the types of materials employed to obtain structured viscosity.

The non-structured viscosity provides another unique benefit in that the carrying capacity will vary in the agitated and non-agitated states, so that when, for example, the agitation is reduced in a separating tank the carrying capacity will drop off and the cuttings and the like from the wellbore will fall out of the fluid, yet when agitated there is ample carrying capacity to carry the cuttings and the like to the surface from the wellbore.

Unfortunately, the noted instability of these materials in boreholes and have made them unsuited as viscosifiers and relegated them to the task of a water loss additive in clay-based fluids.

U.S. Pat. No. 3,878,110 to Miller et al discloses drilling fluids having improved water loss and rheological properties containing dolomite and CaO, MgO, or a mixture thereof and optionally a starch. It has been determined that CaO is detrimental to the rheological properties of starch and guar gum in the absence of dolomite. Even the presence of MgO does not overcome the detriments caused by the CaO.

It is an advantage of the present additive compositions that it has extended stability and effectiveness over a higher temperature range. A particular feature is that faster yields are obtained by using the additive composition in wellbore fluids. A particular advantage of the present additive composition is that the water loss effectiveness is greater and is extended beyond that normally achieved with guar gum. These and other advantages and features of the present invention will be apparent from the disclosure, descriptions and teachings set out below.

SUMMARY OF THE INVENTION

Briefly stated the present invention is an additive composition for use in clay-free, non argillaceous, wellbore fluids comprising guar gum and a stabilizing amount of magnesia or magnesium hydroxide and the wellbore fluids containing said additive composition. The additive composition comprises guar gum and at least 10 weight percent magnesia or magnesium hydroxide based on the weight of guar gum. Preferably the composition will contain about 28 to 50 weight percent of magnesia or magnesium hydroxide on this same basis.

The compositions of the present invention are substantially free or devoid of dolomite (CaMg carbonate). The only solids present, other than drilled particles or other materials coming into the fluid from its use in the wellbore operation results from magnesia present in excess over that portion soluble in the fluid.

DETAILED DESCRIPTION OF THE INVENTION AND PREFERRED EMBODIMENTS

Guar gum is a natural vegetable colloid commercially produced in the form of a powder. Commercial guar gum is a component of the legumenous seed *Cyamopsis tetragonaloba*. The gum occurs in the endosperm of these seeds where its natural function is to reserve food supply for the developing plant. Guar gum is a polysaccharide consisting of a complex carbohydrate polymer of galactose and mannose and is chemically classified as a galactomannan.

Magnesia is a highly infusible magnesium oxide (MgO), prepared by the calcination of magnesium carbonate, ($MgCO_3$). Magnesia is only slightly soluble in water, e.g., 0.0086 grams/100 cc (86 ppm) of water at 30° C. and is essentially nonhydratable. One theory for the effectiveness of the present invention is that the very slightly soluble magnesia which is present in excess of its solubility in the wellbore fluid provides a reservoir of basicity of just the correct amount to maintain the pH of the fluid in the range at which the guar gum is most stable. Magnesium hydroxide may be similarly viewed. This theory is proposed as a possible explanation for the operation of the present invention and is not intended to limit the scope of the invention.

The slight solubility of magnesia and magnesium hydroxide in wellbore fluids results in a very low magnesium ion concentration, that is, for example MgO has less than 0.001% or 10 ppm of magnesium ion concentration or dissolved magnesium, yet the pH remains strongly alkaline when employed in stabilizing amounts. The amount of magnesia or magnesium hydroxide in the composition may be greater than 50 weight percent without detriment to the operation of the composition in the wellbore fluid, e.g., several hundred times the specified minimum amount may be added with no ill effect on the viscosifer (guar gum) or the drilling fluid.

The amount of the composition employed in the wellbore fluid is not critical and may vary for different applications of the fluid. Generally at least 0.5 pounds up to about 5 or 10 pounds of guar gum per U.S. barrel (42 U.S. gallons) will be employed. Hence, as stated above there will at least be 0.05 ppb of magnesia or magnesium hydroxide present in the wellbore fluid based on the weight of guar gum. This minimum amount of magnesia and magnesium hydroxide represents an excess of magnesia beyond that soluble in the wellbore fluid, e.g., greater than 0.0035 pounds of magnesia per barrel of water.

In addition to the guar gum and magnesia or magnesium hydroxide other conventional wellbore additives can be present, serving their usual functions. For example, the alkali and alkaline earth lignosulfonate salts such as calcium lignosulfonate, sodium lignosulfonates serving as water loss additives, starches, gums, and oil also serving as water loss additives, density modifying material such as calcium chloride, sodium chloride and zinc chloride. In other words, any of the known additive materials may be added so long as the basic characteristics of the non-clay wellbore fluid are not changed.

As stated above dolomite is not present in the present compositions, since it is of no value. Generally, other inert weighting materials such as calcium carbonate are not necessary or employed in the wellbore fluid compositions of the present invention, hence the present compositions may be devoid of any inert weighting materials.

It has been found that the pH of the drilling fluid after combining it with the additive composition of the present invention should be highly alkaline, i.e., preferably about 8.5 or more preferably 8.5 to about 11 to obtain yield.

The wellbore fluid will contain a substantial amount of water, i.e., it is an aqueous based fluid. Oil may be present to form water-oil wellbore fluids with appropriate emulsifiers as known in the art. The present additive composition and amounts in the wellbore fluid, however, relate only to the aqueous portion.

One embodiment of the present invention is a wellbore fluid consisting essentially of water and an electrolyte inhibitor for preventing hydration, selected from the group consisting of at least 600 ppm calcium ion, at least 200 ppm aluminum ion or chromium ion, at least 1,500 ppm potassium chloride, at least 5000 ppm sodium chloride and combinations thereof.

Brines provide a preferred wellbore fluid of the present invention, generally containing at least 1.0% by weight of a soluble salt of potassium, sodium or calcium in water. In addition, the brine may contain other soluble salts, for example, zinc, chromium, iron, copper and the like. Generally, the chlorides are employed because of availability, but other salts such as the bromides, sulfates and the like may be used. The soluble salts of the brine, not only furnish the weighting material by adjusting the density of the soluble, but also typically furnish the cations for inhibiting the fluid against hydration of solid materials.

EXAMPLES 1–12

In these Examples the components were added to a brine solution of NaCl. The additives, other than guar gum (if any) were added to the brine first followed by the guar gum. The samples were dynamically aged for 16 hours at 175° F., cooled to room temperature (~75° F.), stirred 5 minutes and tested.

The compositions, tests and results are set out below in Table I.

TABLE I

| Example No. | 1 | 2 | 3 | 4 | 5 | 6 | 7 | 8 | 9 | 10 | 11 | 12 |
|---|---|---|---|---|---|---|---|---|---|---|---|---|
| 9.1 ppg NaCl Brine, bbl | 1 | 1 | 1 | 1 | 1 | 1 | 1 | 1 | 1 | 1 | 1 | 1 |
| Guargum, ppb | 1.75 | 1.75 | 1.75 | 1.75 | 1.75 | 1.75 | 1.75 | 1.75 | 1.7 | 1.7 | 1.7 | 1.7 |
| MgO, ppb | .2 | .6 | 1.0 | 2.0 | 5.0 | | | | | | 0.9 | |
| Mg(OH)$_2$, ppb | | | | | | .2 | .6 | 1.0 | | | | 0.9 |
| Calcium Ligno-Sulfonate, ppb | | | | | | | | | | 1.7 | 1.7 | 1.7 |
| Apparent Viscosity, cp | 20 | 23.5 | 24 | 23-3/4 | 25-1/4 | 20.5 | 20 | 22.5 | 15.5 | 7.5 | 17.5 | 16 |
| Plastic Viscosity, cp | 13 | 14 | 14 | 14.5 | 14.5 | 13 | 12 | 13 | 11 | 7 | 12.5 | 12 |
| Yield Point #/100 sq.ft. | 14 | 19 | 20 | 18.5 | 22.5 | 15 | 16 | 19 | 9 | 1 | 10 | 8 |
| Gels, Initial/10 min. | 3/3 | 3/3 | 3/3 | 3/3 | 4/4 | 2/2.5 | 2/3 | 3/3 | 2/3 | 2/3 | 2/3 | 2/2 |
| pH | 9.8 | 9.9 | 9.8 | 9.9 | 10.0 | 8.7 | 9.0 | 9.2 | 7.6 | 6.9 | 9.8 | 8.5 |
| API Fluid Loss, cc | 110.0 | 98.0 | 94.0 | 88.0 | 64.3 | 176.0 | 80.5 | 147.0 | 105 | 24 | 18 | 60 |

EXAMPLES 13–15

In these runs the additives were added to 1 barrel (42 U.S. gallons) of tap water. The additives other than guar gum (if any) were first added to the water followed by the addition of guar gum. The aqueous mixture was stirred at slow speed for 5 minutes and the test run for initial viscosity and pH properties and after standing overnight at 67° F. for which the results are reported in the Table II. A second set of runs on the same compositions was made after aging 1 hour at 67° F. for viscosity, pH and fluid loss (API) also reported in the Table II. Viscosity determinations were also made according to API standards, using a direct indicating viscometer, specifically a Fann V-G meter. The pH was determined with a Beckman glass electrode pH meter. The quanties listed below are in pounds per barrel (ppb).

TABLE II

| EXAMPLE | 13 | 14 | 15 |
|---|---|---|---|
| Composition (pounds per bbl) | | | |
| Mg(OH)$_2$ (NF* grade) | 1 | | |
| MgO, ppb | | 1 | 1 |
| CaLig*, ppb | | | 3 |
| Guar gum, ppb | 1 | 1 | 1 |
| Initial yield properties after 5 minutes stirring | | | |
| 600 Fann | 15 | 4 | 13½ |
| 300 Fann | 9½ | 2½ | 8 |
| PV*, cp | 5½ | 1½ | 5½ |
| YP, lb/100 ft$^2$ | 4 | 1 | 2½ |
| pH | 9.55 | 10.55 | 10.25 |
| Properties after overnight aging, 5 minutes stirring | | | |
| 600 Fann | 17½ | 13 | 18½ |
| 300 Fann | 11½ | 7½ | 11½ |
| PV*, cp | 6 | 5½ | 7 |
| VP, lb/100 ft$^2$ | 5½ | 2 | 4½ |
| pH | 9.7 | 10.35 | 10.35 |
| Properties after add 1 ppb guar gum stirred 5 minutes, aged 1 hour 67° F. | | | |
| 600 Fann | 44½ | 29 | 39½ |
| 300 Fann | 33½ | 20 | 28½ |
| PV* cp | 11 | 9 | 11 |
| YP lb/100 ft$^2$ | 22½ | 11 | 17½ |
| pH | 9.7 | 10.35 | 10.3 |
| API Filtrate ml | | 52.1 | 37.2 |

*CaLig-calcium lignosulfonate marketed by St. Regis Pulp & Paper Co. as Toranil B. PV-plastic viscosity, YP-yield point, cp-centipoise, NF-National Formulary

EXAMPLES 16–23

In each run starch or guar gum was added to a 9.1 ppg NaCl brine followed by the addition of the other additives (if any). The samples were aged dynamically for 16 hours at 175° F. in a roller oven turning at approximately 30 rpm's, cooled to room temperature (75° F.), stirred for 5 minutes and tested as follows:

| Example | 16 | 17 | 18 | 19 | 20 | 21 | 22 | 23 |
|---|---|---|---|---|---|---|---|---|
| Component | | | | | | | | |
| Starch$^{(1)}$, ppg | 1.7 | 1.7 | 1.7 | 1.7 | — | — | — | — |
| Guar gum, | — | — | — | — | 1.7 | 1.7 | 1.7 | 1.7 |

-continued

| Example | 16 | 17 | 18 | 19 | 20 | 21 | 22 | 23 |
|---|---|---|---|---|---|---|---|---|
| ppg |  |  |  |  |  |  |  |  |
| CaO, ppg | — | 1 | — | .2 | — | 1 | — | .2 |
| MgO, ppg | — | — | 1 | 1 | — | — | 1 | 1 |
| Test |  |  |  |  |  |  |  |  |
| Apparent vis, cp | 2 | 1.5 | 2 | 2 | 17 | 2 | 23 | 19.5 |
| Plastic vis, cp | 1.5 | 1 | 2 | 1.5 | 12.5 | 1.5 | 12.5 | 13 |
| Yield Point #/100 sq ft. | 0.5 | 1 | 0 | 0.5 | 9 | 1 | 20.5 | 13 |
| Gel Initial/10 min | 0/1 | 1/1 | 1/1 | 1/1 | 2/2 | 0/1 | 4/5 | 4/5 |
| API, Fluid loss, cc | 32 | 350[2] | 28 | 92 | 64 | 87 | 43 | 27 |

[1]Basco — unmodified corn starch, sold by Milwhite Company
[2]Fluid loss occurred in first two minutes of test The presence of CaO is detrimental to both the water loss and rheological properties of both starch and guar gum. Hence, CaO is neither desired or required and the present compositions are preferably devoid of CaO.

The invention claimed is:

1. A wellbore fluid additive viscosifying composition for use in clay free wellbore fluids consisting of guar gum and at least 10 weight percent of magnesia based on guar gum.

2. The composition according to claim 1 wherein from 28 to 50 weight percent magnesia is present.

3. A clay-free, non-thixotropic wellbore fluid being devoid of dolomite and having improved viscosity stability consisting essentially of water, at least 1.0% by weight of a soluble salt of potassium, sodium or calcium, a viscosifying amount of guar gum and at least 10 weight percent of magnesia based on guar gum.

4. The wellbore fluid according to claim 3 wherein from about 0.5 to 5 pounds of guar gum per barrel of water is present.

5. The wellbore fluid according to claim 3 wherein from about 28 to 50 weight percent magnesia is present.

6. The wellbore fluid according to claim 3 wherein up to about 10 pounds of guar gum per barrel of water is present.

* * * * *